W. G. SHEPPARD.
SOIL CUTTING AND WORKING MACHINE.
APPLICATION FILED AUG. 28, 1920.

1,370,847.

Patented Mar. 8, 1921.
2 SHEETS—SHEET 1.

William G. Sheppard,
By Watson E. Coleman
Attorney

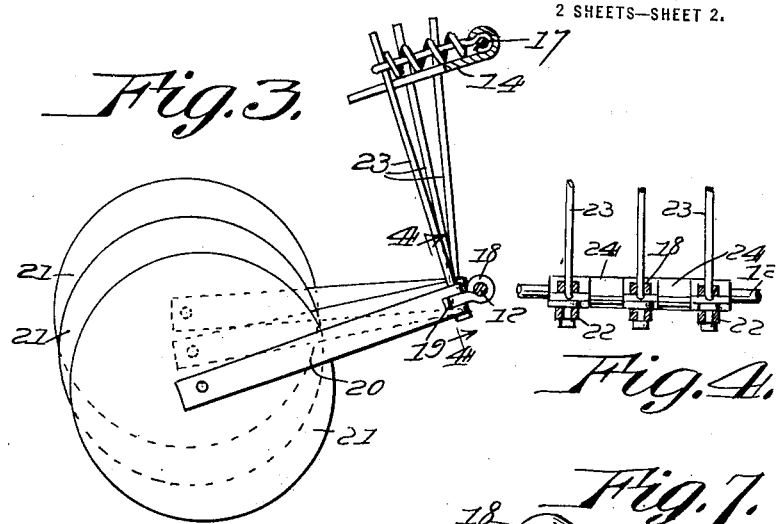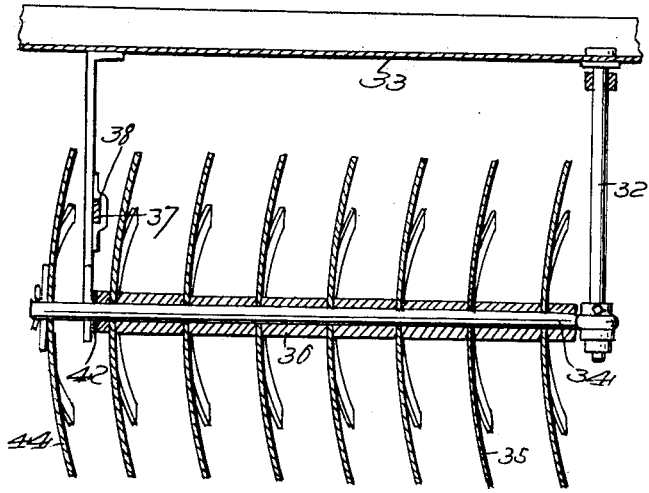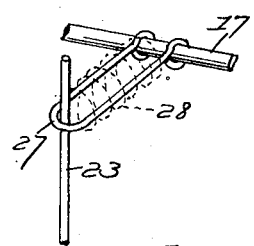

UNITED STATES PATENT OFFICE.

WILLIAM G. SHEPPARD, OF CHAMPAIGN, ILLINOIS.

SOIL CUTTING AND WORKING MACHINE.

1,370,847.      Specification of Letters Patent.      Patented Mar. 8, 1921.

Application filed August 28, 1920. Serial No. 406,706.

*To all whom it may concern:*

Be it known that I, WILLIAM G. SHEPPARD, a citizen of the United States, residing at Champaign, in the county of Champaign and State of Illinois, have invented certain new and useful Improvements in Soil Cutting and Working Machines, of which the following is a specification, reference being had to the accompanying drawings.

This invention relates to an improved soil cutting and working machine, and one of the objects is to provide a machine of this kind wherein a plurality of forward cutting disks are employed for cutting the soil, there being rearwardly disposed soil working disks having blades which are curved in the direction opposite to the rotation of said working disks, and curved or bent laterally thereby acting to work the soil after the soil has been cut by the forward disks.

Another object is the provision of means for raising and lowering the plurality of cutting disks simultaneously.

Still another object is the provision of means for permitting the forward cutting disk to yield individually relatively to the soil in order that the disks may individually accommodate themselves to the irregularities of the soil as the machine traverses the same.

A further object is the provision of means for permitting the forward cutting disks to have individual pivotal movements as the machine traverses the surface of the soil.

A still further object consists in the provision of means for raising and lowering the rear portion of the frame of the machine, whereby the soil working disks may be raised and lowered relatively to the soil.

Additionally the invention aims to provide frames including shafts on which the soil working disks are individually movable.

It will be noted that the soil working disks are arranged on shafts extending toward each other rearwardly, and the frames which support the shafts are pivoted and hence it is the aim to provide means operatively connected to the frames which support the shafts carrying the soil working disks so as to move the frames at different angles relatively to each other so as to vary the action of the soil working disks on the soil as the machine traverses the surface thereof.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the improved soil cutting and working machine constructed in accordance with the invention.

Fig. 2 is a view in side elevation, showing the means for moving the frames which carry the working disks so that the frames may assume different positions relatively to each other and also showing the forward cutting disks raised, Fig. 3 is an enlarged detail sectional view on line 3—3 of Fig. 1, showing the forward cutting disks with several of them yielding so that they may accommodate themselves to the irregularities of the soil, Fig. 4 is a sectional view on line 4—4 of Fig. 1, showing the mounting of the cutting disks on a rod at the forward part of the machine, Fig. 5 is a sectional view on line 5—5 of Fig. 1, showing the arrangement of the soil working disks.

Fig. 6 is a detail perspective view of the parts 17, 23, 27 and 28,

Fig. 7 is a detail view of one of the sleeves 18,

Fig. 8 is a detail view of one of the collars 24,

Fig. 9 is a detail view of one of the beams 20.

Figure 1:
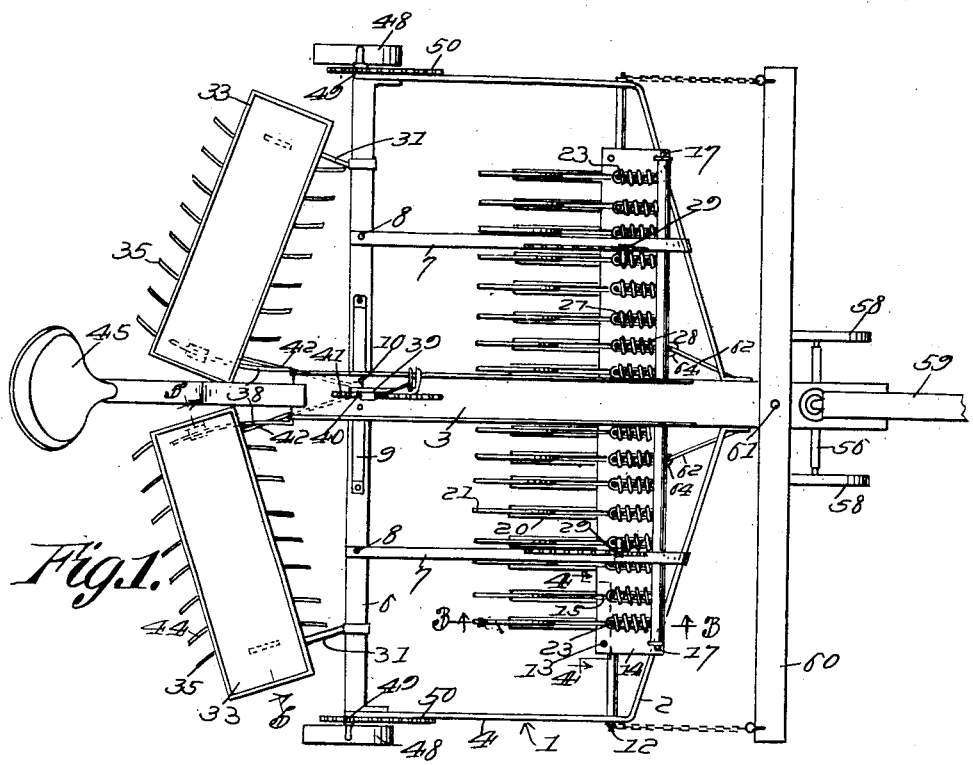
Figure 2:
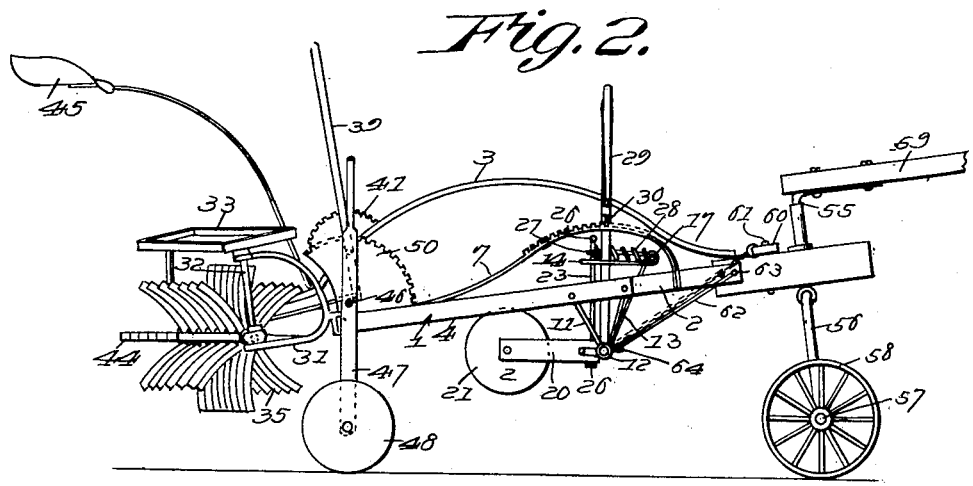

Referring to the drawings, 1 designates the frame of the machine which comprises a forward extension 2, the rearwardly extending central arch 3 and the laterally and rearwardly extending arms 4. The rear ends of the arms 4 are bolted or otherwise secured to the channel bar 6. The ends of this channel bar have lateral lugs which are bolted or otherwise secured to the rearwardly extending portions of the arms 4. By this construction a rigid frame is afforded.

Secured to the portions 2 of the arms 4 are arched bars 7 which extend rearwardly and are secured at 8 to the channel beam or bar 6. The arched bars 7 act to additionally reinforce the frame and to insure rigidity. In order to further reinforce the frame brackets 9 are fixedly carried by the transverse channel bar or beam 6 and are positioned to extend upwardly and are in turn fixedly connected at 10 to the central arched bar or beam 3 of the frame.

Mounted in depending bearings 11 of the arms 4 of the frame is a shaft 12. An auxiliary frame 13 is mounted pivotally upon the shaft 12 and the plate 14 of this frame is provided with a series of rearwardly extending slots 15. This plate 14 has a plurality of bearings in which the shaft or rod 17 is mounted. A plurality of collars 18 is mounted on the shaft 12 and these collars are designed to move pivotally and individually relatively to each other.

These collars 18 are provided with ears 19 and the beams 20 which carry the cutting disks 21 have bifurcated ends to straddle the ears or lugs 19. The arms or forks caused to be formed by bifurcating the forward ends of the beams, terminate in eyes 22 through which and through the lugs or ears 19 pins or rods 23 extend thereby pivotally connecting the beams of the forward cutting disks to the collars. Also mounted upon the rod or shaft 12 are spacing sleeves 24 which are disposed between the collars 18 to hold them equally spaced apart. The upper portions of the rods 23 engage the slots of the plate 14 movably and the extremities of the rods terminate in heads 26.

Loops 27 engage the rods immediately below the heads 26 and are in turn connected to the rod or shaft, which is carried in the bearings of the plate 14. Coil springs 28 are in surrounding relation to the loops between the bearings and the upper portions of the pivot pins or rods thereby acting to apply pressure rearwardly on the rod thereby maintaining the forward soil cutting disks individually and yieldably in contact with the soil so that they can individually accommodate themselves to the surface of the soil. The arched bars 7 are arcuate with relation to the shaft 12 and carried by the frame which is mounted upon the shaft 12 is a pair of levers 29 which have hand grip operated dogs 30 which coöperate with the teeth of the bar 7 to hold the levers in different adjusted positions so that the disk cutters may be raised and lowered very quickly, yet owing to the construction for mounting the disk cutters on the shaft 12, said disk cutters may individually rise and lower and accommodate themselves to the irregularities in the surface of the soil.

Suitable brackets 31 are bolted to the transverse channel beam 6 adjacent its ends, and mounted pivotally in the arms of these brackets are the remote depending pins 32 of the frames 33. These pins 32 depend from the remote ends of the frames 33 so that the adjacent ends of the frame are capable of movement forwardly and rearwardly owing to the pivot connections of the frames in said bracket. The lower ends of the pins 32 have bearings in which supporting rods or shafts 34 are journaled. A plurality of soil working disks 35 are mounted upon the shafts 34 to individually rotate or move as they traverse the surface of the soil. These cutting disks 35 are relatively spaced by means of the intermediate collars 36.

The adjacent pins of the frames 33 have guides 37 in which the arms 38 of the central arch are guided. These arms 38 are curved concentrically with the pivots of the frames 33. A lever 39 is pivotally mounted upon the central arch and is provided with a hand grasp operated dog 40 for coöperating with the teeth of the arcuate rack 41 so as to hold the lever 39 in different adjusted positions.

Links 42 connect the lower end of the lever 39 and the shafts 34 whereby upon movement of the lever 39 in one direction or the like, the soil working disks may be disposed at relative angles so as to vary the working action of the working disks on the soil. It will be noted that each working disk comprises a body having cutting arms 44 which are curved in directions opposite to the rotation of the working disks and also curved laterally thereby insuring working the soil when the machine traverses over the surface thereof. A suitable seat 45 is carried by the central arch so that the operator may be mounted upon the machine when it is moving over the surface of the soil.

Pivoted at 46 to the rear portions of the arms 4 are wheel carrying bars 47 the lower ends of which are forked as shown and in these forks the axles of the supporting wheels 48 are journaled. These bars have hand grip operated dogs 49 which are designed to engage the teeth of the arcuate racks 50 which are carried by the arm 4.

By adjusting the bars 47 forwardly or rather tilting them forwardly, the wheels will move rearwardly, hence the frame of the machine will lower to bring the soil working disks in contact with the soil to work the same. A movement rearwardly of the bars or levers 47 will move the wheels so as to elevate the frame.

Swiveled on the forward extension frame is an upstanding rod or shaft 55, the lower end of which terminates in an arch axle 56 on the stub ends 57 of which forward supporting wheels 58 are journaled, for supporting the forward end of the frame. A conventional form of tongue 59 is swivelly connected to the upper end of the rod or shaft 55 to which draft animals may be hitched for drawing the machine over the surface of the soil. A suitable equalizer 60 is pivotally mounted upon the extension of the frame to which the draft animals are connected to insure drawing the machine over the surface of the soil. Suitable draft pins 61 connect the main beam of the equalizer and the depending bearings of the arms 4 of the frame.

A loop rod 62 has its looped end 63 pivoted in the extension frame and the rear terminals of the arms of the loop rod are connected to the ears of the collars 64 which are also mounted upon the shaft 12 in order to steady the shaft.

The frames 33 are provided with marginal flanges, and are designed to support suitable weights or the like, so as to hold the soil working disks in engagement with the soil. The marginal flanges act to prevent displacement of said weights as the machine traverses the field.

The invention having been set forth, what is claimed as new and useful is:—

1. In a soil cutting and working machine, a supporting frame, a shaft journaled in bearings of said frame, a plurality of forward cutting disks mounted on said shaft for vertical movement individually, said cutting disks being individually horizontally pivoted, whereby the disks may accommodate themselves freely to the surface of the soil in lateral directions.

2. In a machine as set forth, a wheel supported frame, a shaft journaled in bearings of said frame, a plurality of cutting disks mounted on the shaft for horizontal individual free pivotal movement whereby the disks may accommodate themselves laterally to the irregularities of the soil.

3. In a machine as set forth, a wheel supported frame, a shaft journaled in bearings of said frame, a plurality of cutting disks mounted on the shaft for horizontal individual free pivotal movement whereby the disks may accommodate themselves laterally to the irregularities of the soil, said disks being mounted for individual vertical pivotal movement, and yieldable means operatively connecting with the cutting disks to permit them to yield individually and vertically in order to accommodate themselves to the surface of the soil.

4. In a soil cutting and working machine, a supporting frame, a shaft journaled in bearings of said frame, a plurality of forward cutting disks mounted on said shaft for vertical movement individually, said cutting disks being individually horizontally freely pivoted, whereby the disks may accommodate themselves to the surface of the soil in lateral directions, and means operatively connected to all of the disks for raising them simultaneously.

5. In a machine as set forth, a main wheel supported frame, a pair of auxiliary frames having their remote ends pivoted on the main frame whereby their adjacent ends may move arcuately to and from the rear of the main frame and laterally, shafts carried by the auxiliary frames, individually movable soil working disks journaled on said shafts of the auxiliary frames, the main frame having operative guide connections with the adjacenet ends of the auxiliary frames, and means operatively connected to the adjacent ends of the auxiliary frames for moving the adjacent ends relatively to the main frame on the guide connections.

6. In a machine as set forth, a wheel supported frame, a pair of brackets fixed to the rear portions of the remote ends of said frame, shafts having their remote ends pivotally mounted on said brackets and carrying spaced individually rotating soil working disks, arcuate arms pivotally carried by the adjacent ends of said shafts and extending toward the central rear portion of the main frame, guides on the central rear portion of the main frame in which said arms are guided, means carried by the main frame and connected to the adjacent ends of the shafts, for moving the shafts toward and from the main frame arcuately.

7. In a machine as set forth, a main frame, supporting wheels therefor, a pair of brackets fixed to the remote ends of the rear portions of the main frame, weight supporting frames at the rear of the main frame, vertical rods mounted in said remote brackets and to the upper ends of which the weight supported frames are fixedly connected, whereby said weight supporting frames may move pivotally toward the main frame, shafts pivotally mounted upon the lower portions of said rods of the brackets, means carried by the said weight supported frames and operatively receiving the adjacent ends of said shafts, guides on the rear of the main frame, and arcuate arms connected to the adjacent ends of the shafts and engaging said guides, soil working disks mounted rotatably on said shafts, said weight supporting frames adapted to receive weights to hold the soil working disks in engagement with the ground.

8. In a machine as set forth, a main frame, supporting wheels therefor, a shaft mounted in bearings of said main frame, a plurality of couples mounted upon said shaft, a plurality of bars pivotally connected to the couples to move horizontally, disks carried by the bars, rods pivotally connecting the bars and the couples, a transversely disposed shaft above said first named shaft, a plate pivotally mounted upon the second named shaft, rods pivotally connected to the second named shaft and having eyes at their rear ends receiving the rods which constitute the pivots between the couples and the bars, and coiled springs interposed between the eyes and the pivotal point of said plate, said rods which constitute the pivots between the couples and bars being extended and movably engaged in said plate, whereby the disks carried by the bars may move yieldably laterally in directions to accommodate themselves to the irregularities of the field.

In testimony whereof I hereunto affix my signature.

WILLIAM G. SHEPPARD.